March 5, 1957

J. FELBER 2,783,693

FIBRE BLANK FOLDING MACHINE WITH
ADHESIVE HEATING ATTACHMENT

Filed April 9, 1954

INVENTOR.
JOHN FELBER

BY
*Charles H. Erne*
*Leland R. McCann*
*George W. Reiber*
ATTORNEYS

March 5, 1957

J. FELBER 2,783,693

FIBRE BLANK FOLDING MACHINE WITH
ADHESIVE HEATING ATTACHMENT

Filed April 9, 1954

INVENTOR.
JOHN FELBER
BY
ATTORNEYS

United States Patent Office 2,783,693
Patented Mar. 5, 1957

2,783,693

FIBRE BLANK FOLDING MACHINE WITH ADHESIVE HEATING ATTACHMENT

John Felber, Hillside, N. J., assignor to American Can Company, New York, N. Y., a corporation of New Jersey Application April 9, 1954, Serial No. 422,164

10 Claims. (Cl. 93—52)

The present invention relates to a machine for folding fibre blanks to produce rectangular shaped tubular container bodies having opposed overlapping marginal edge portions secured together with a thermoplastic adhesive to form side seams for the bodies and has particular reference to improved heating devices for tackifying the thermoplastic adhesive during and in cooperation with the folding operation to expedite the formation of the side seams.

In the manufacture of rectangular shaped fibre containers, such as the well known fibre milk containers, the bodies of the containers usually are made from a one-piece flat blank which is folded along predetermined crease lines to form a tubular body having opposed marginal edge portions overlapped and prepared to be adhesively secured together in a side seam. Where a thermoplastic adhesive is used it is applied in a predetermined pattern to one side seam edge portion of the blank and allowed to dry so that the blanks may be stacked for feeding into a folding machine.

In the folding machine a blank at the crease lines is partially folded into shape and just before the side seam edge portions are brought together, the thermoplastic adhesive is heated to render it tacky. Following this heating operation the side seam edge portions are folded into engagement, with the tacky adhesive disposed between them and are then pressed together to bond the edge portions to each other. After the adhesive is heated the side seam edge portions must be folded into contact with each other as rapidly as possible since the adhesive cools rapidly and loses its tackiness with the result that a weak bond sometimes is produced.

An object of the invention is the provision in a container body folding machine of thermoplastic adhesive heating devices which effect heating of the adhesive while the body is being continously advanced and folded into its tubular shape so as to expedite the closing together of the side seam marginal edge portions to produce a side seam before the heated adhesive cools and to thereby insure strongly bonded seams.

Another object is the provision in such a machine of heating devices wherein a direct heat is applied to the adhesive coated marginal edge portion of the advancing body and caused to follow the path of travel of the edge portion as the body is being folded so as to provide the application of the heat constantly at a proper distance from the adhesive.

Another object is the provision in such a machine of heating devices which include a tapered burner having spirally arranged heating elements which impinge an open gas flame directly against the adhesive pattern as the body blank passes and while the folding takes place so as to keep the burner and heating station as compact as possible.

Numerous other objects and advantages of the invention will be apparent as it is better understood from the following description, which, taken in connection with the accompanying drawings, discloses a preferred embodiment thereof.

Referring to the drawings.

As a preferred or exemplary embodiment of the invention the drawings illustrate principal parts of a container or box folding machine of the character disclosed in United States Patent 2,589,944 issued March 18, 1952 to H. S. Labombarde on Machine for Prebreaking, Gluing, Folding, Delivering and Stacking Creased Carton Blanks.

In the machine, flat, rectangular shaped, fibre blanks A (Fig. 11) having transverse crease lines B, C, D, E and having side seam marginal edge portions F, G, one of which carries a band or pattern of dried thermoplastic adhesive H, are folded inwardly along two of the crease lines, B and D, to overlap the side seam marginal edge portions F, G with the adhesive H disposed between them to produce a flat or collapsed container body J (Fig. 10) having a lapped side seam K. During this folding operation the thermoplastic adhesive H is heated to a tacky condition and is maintained in this condition until the side seam edge portions F, G are brought together so as to prevent cooling of the adhesive and to thus produce a strong bond between the seam edge portions. The invention is directed particularly to this heating feature. The collapsed container body J is discharged from the machine in its flat condition for subsequent reforming or spreading apart and further folding along the crease lines C and E into a tubular rectangular shaped container body.

The blanks A to be folded are fed into the machine at its entrance end (the left as viewed in Figs. 1, 2 and 3) from the bottom of a stack of such blanks disposed in a magazine 21. The magazine 21 is surrounded by a plurality of vertically disposed rails 22 arranged to retain the blanks A in stacked formation. The lower ends of the rails 22 are secured to a frame 23 which constitutes the main frame of the machine. The bottom of the magazine 21 is open.

The lowermost blank A in the magazine 21 rests on and is fed laterally from the magazine by a pair of spaced and parallel short endless belt conveyors 25 which operate over a driving pulley 26, a driven pulley 27, and a pair of stack supporting idler pulleys 28, the latter being disposed under the upper runs of the conveyors 25 and under the magazine 21. The driving pulley 26 is mounted on a cross-shaft 31 while the other pulleys 27, 28 are formed with trunnions 32, 33 which are journaled in bearings in the main frame 23. The driving pulley 26 is rotated continuously by an endless chain 35 which operates over a sprocket 36 carried on the pulley shaft 31 and over a sprocket 37 mounted on a main driving shaft 38 disposed adjacent the magazine 21 and journaled in bearings in the main frame 23. The main driving shaft 38 is rotated in any suitable manner.

Figure 1:
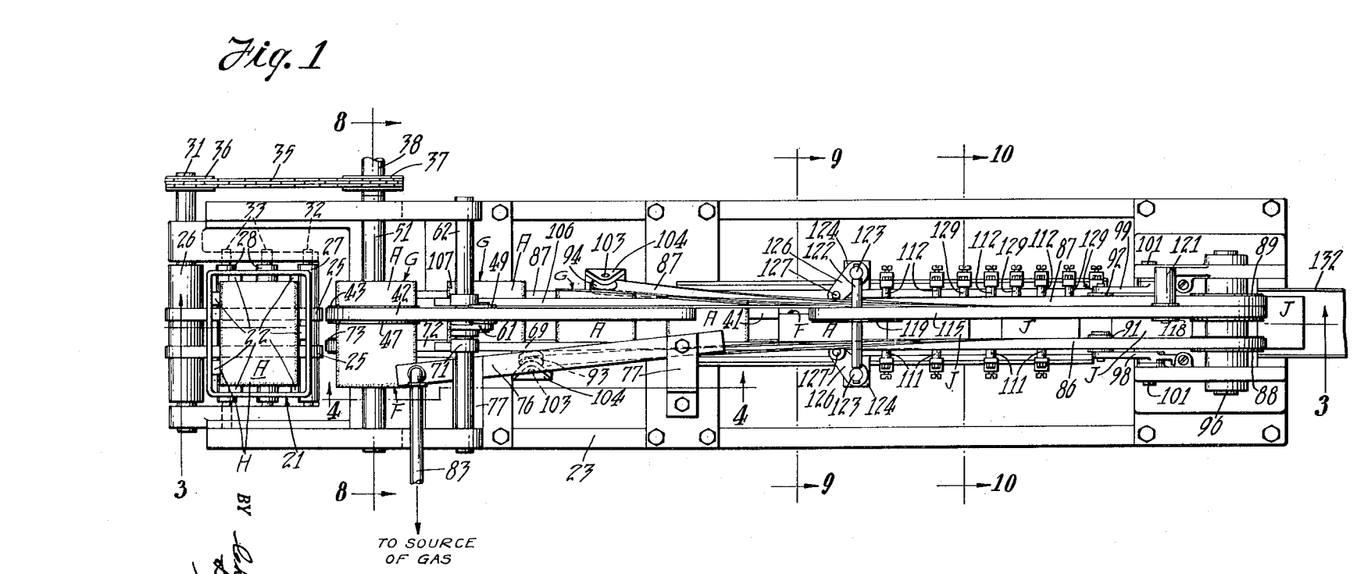
Figure 1 is a top plan view of a folding machine embodying the instant invention, with parts broken away.
Figure 2:
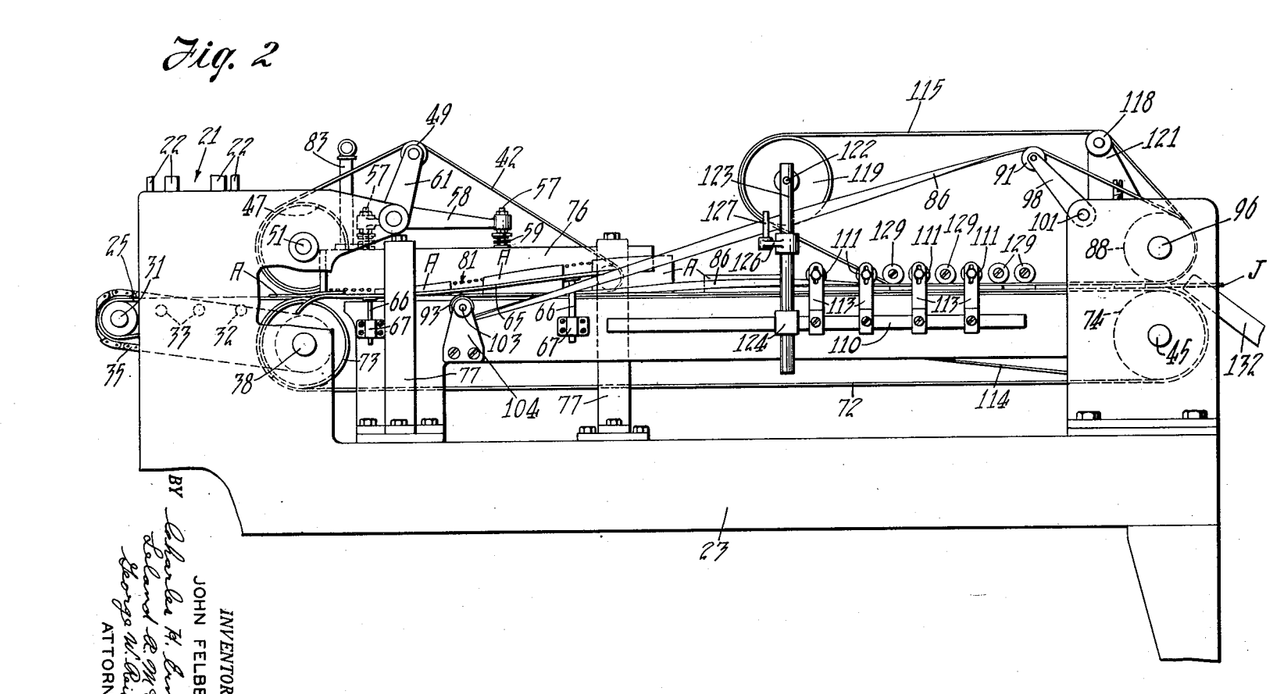
Fig. 2 is a side elevation of the machine shown in Fig. 1, with parts broken away.
Figure 3:
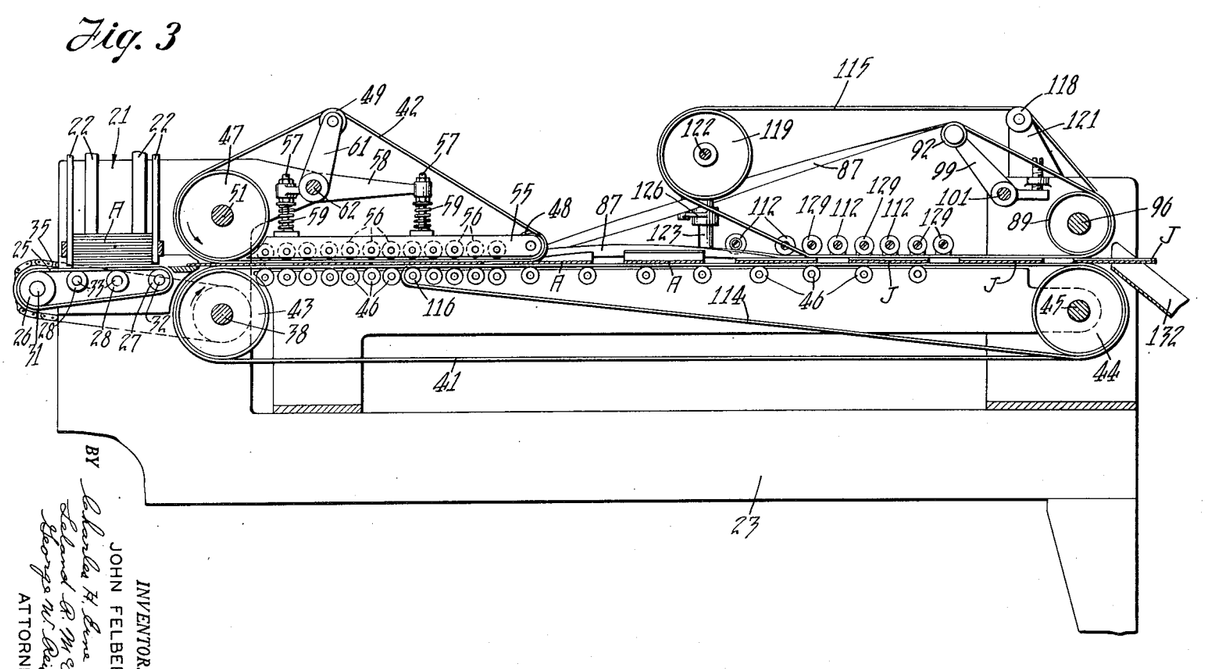
Fig. 3 is a longitudinal section taken substantially along the line 3—3 in Fig. 1, parts being broken away.

Hence as the belt conveyors 25 travel over their pulleys 26, 27, 28, the upper runs of the conveyors frictionally pull the lowermost blank A from the bottom of the stack in the magazine 21 and feed it forward, to the right as viewed in Figs. 1, and 2 and 3, for advancement through the machine. In this manner the blanks are fed successively from the magazine in processional order. As the blanks A are fed from the magazine 21, the dried band H of thermoplastic adhesive is disposed on the upper surface of the blanks and along the blank edge on the right hand side of the machine as viewed in Fig. 8.

Figure 8:
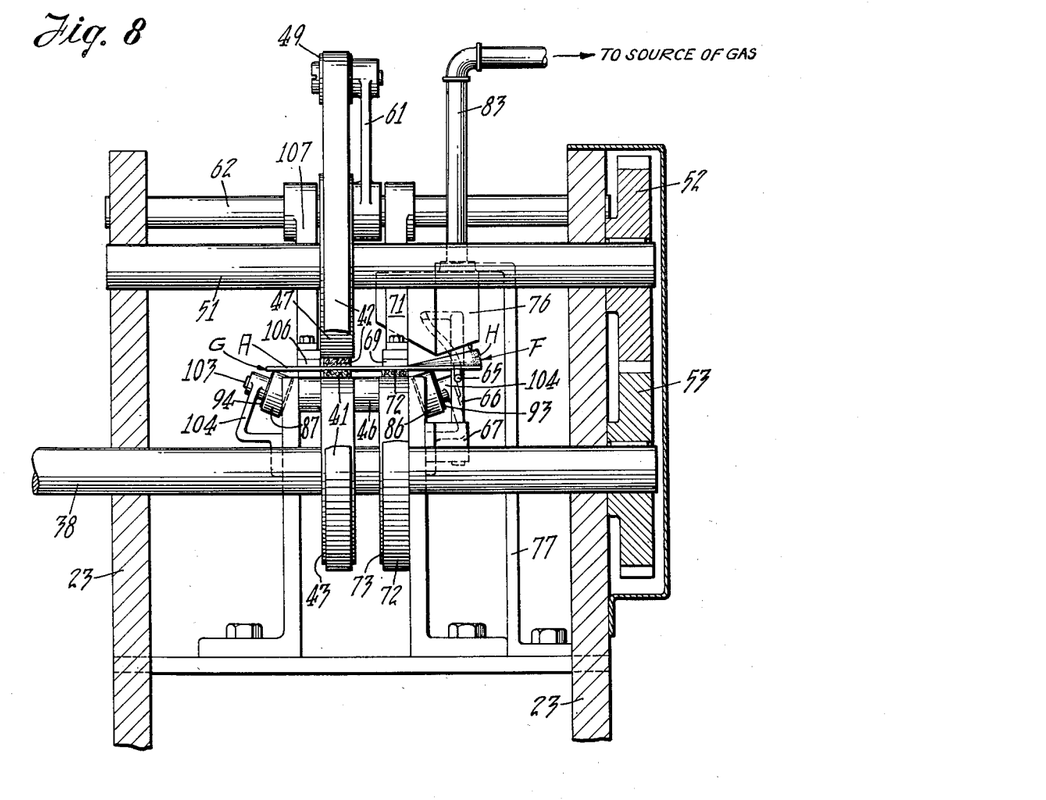
Figs. 8, 9 and 10 are enlarged transverse sectional views taken substantially along the lines 8—8, 9—9, 10—10 in Fig. 1.

As each blank A is fed from the magazine 21, the conveyor 25 advances it into position between parallel and engaging runs of two horizontally disposed lower and upper endless feed belts 41, 42 which grip the blank between them as shown in Figs. 3 and 8 and advance it horizontally edgewise through the machine. The feed belt 41 extends the full length of the machine below the blank feed line and operates over a driving pulley 43 (Fig. 3) and an idler pulley 44. The driving pulley 43 is mounted on the main drive shaft 38 at the blank entrance end of the machine while the idler pulley 44 is mounted on a cross-shaft 45 journaled in bearings formed in the main frame 23 at the discharge end of the machine. Between the pulleys 43, 44 the upper run of the lower belt 41 rides on a plurality of support rollers 46 having trunnions which are journaled in the frame 23.

The feed belt 42 extends for a short distance longitudinally of the machine at the entrance end thereof and is disposed above the blank feed line. This belt 42 operates over a driving pulley 47 and two idler pulleys 48, 49 (Fig. 3). The driving pulley 47 is mounted on a cross-shaft 51 disposed in parallel and vertically aligned relation to the main driving shaft 38 and is journaled in bearings in the main frame 23. This shaft 51 is rotated in unison with the main drive shaft 38 by a pair of meshing spur gears 52, 53 (Fig. 8) which are mounted on the respective shafts.

The idler pulley 48 is mounted at the far end of a horizontally disposed beam 55 (Fig. 3) which is located adjacent the lower run of the upper feed belt 42 and which carries a plurality of pressure rollers 56 which press the belt 42 against the feed belt 41 and thus provide for pressure on the blank A to carry it along with the belts. The beam 55 is suspended from support rods 57 secured in lugs on a bracket 58 extending from the frame 23. Compression springs 59 coiled around the support rods 57 and interposed between the lugs and the beam 55 yieldably press the rollers 56 against the inner face of the lower run of the feed belt 42.

The idler pulley 49 which keeps the feed belt 42 taut is mounted on an arm 61 (Figs. 3 and 8) secured to a cross shaft 62 the ends of which are carried in the frame 23.

Figures 4, 5, 6, 7:
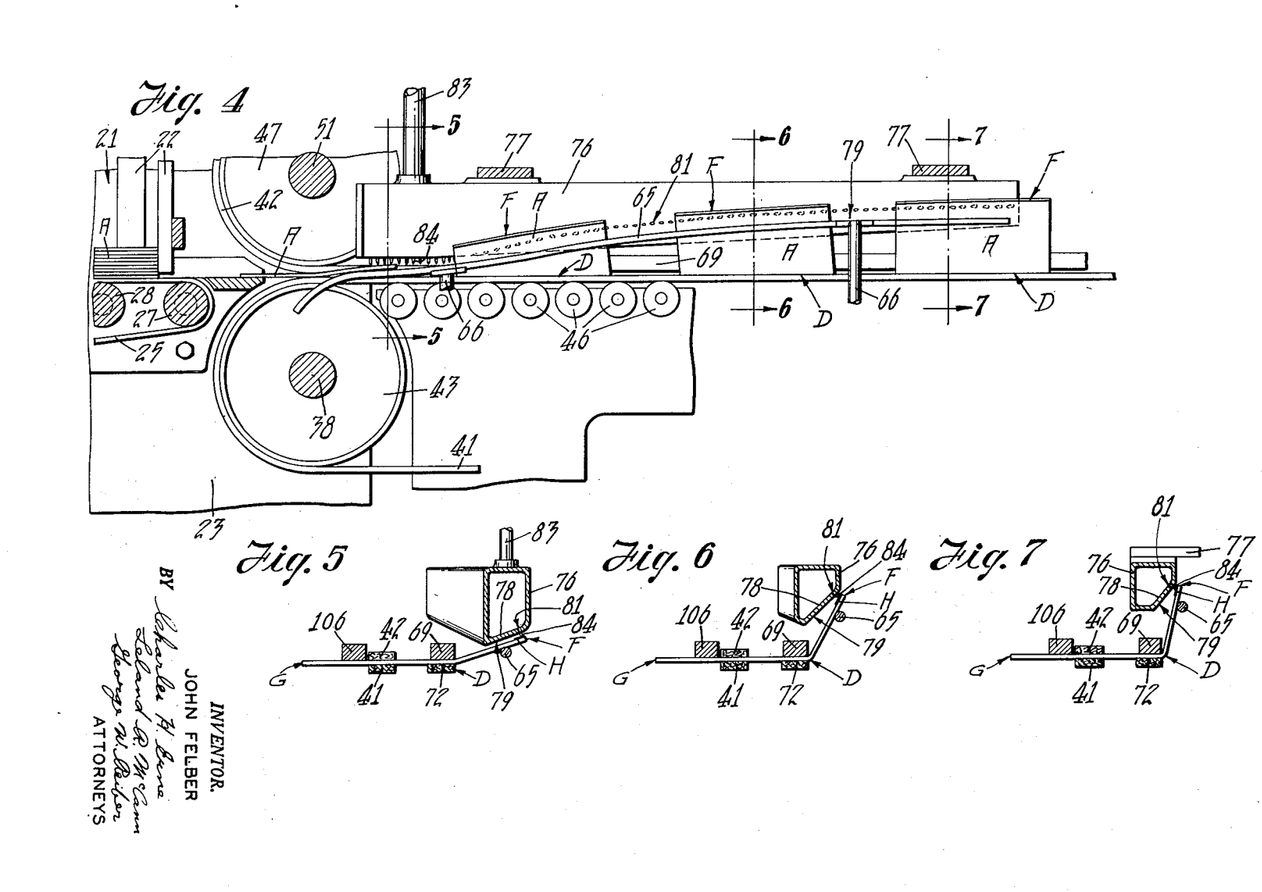
Fig. 4 is an enlarged fragmentary sectional view taken substantially along the broken line 4—4 in Fig. 1.
Figs. 5, 6 and 7 are sectional detail views as taken substantially along the vertical lines 5—5, 6—6, 7—7 in Fig. 4.

As the blank A is advanced by the feed belts 41, 42, the portion of the blank between the crease line D (Fig. 11) and its side seam marginal edge portion F, which constitutes the right hand portion of the blank as viewed in Fig. 8, is progressively folded upwardly along the crease line D to an upright position as best shown in Figs. 5, 6 and 7. This folding of the blank is effected by a stationary spirally curved guide rail 65 (Figs. 2, 4, 5, 6, 7, 8) which is disposed adjacent the path of travel of the marginal edge portion F of the blank and which rail progressively curves upwardly and inwardly from a starting point below the blank feed line as shown in Fig. 4 to a high point as shown in Fig. 8. This guide rail 65 is secured to a pair of support rods 66 (Fig. 2) adjustably carried in support blocks 67 attached to the frame 23. The marginal edge portion of the blank rides on and travels along the curved rail 65 to fold this edge portion upwardly as the blank advances along its path of travel.

In order to insure folding of the blank along its crease line D a stationary creasing bar 69 (Figs. 1, 4, 5, 6, 7, 8) is provided adjacent the path of travel of the crease line D of the blank to back up and support the blank at the crease line during the folding operation. This creasing bar 69 is secured to a bracket arm 71 suspended from the cross-shaft 62 (see Fig. 8). The blank A is pressed upwardly against the creasing bar 69 by an endless belt 72 (Figs. 2, 5, 6, 7, 8) which extends the full length of the machine and which is disposed directly under or below the creasing bar 69. The belt operates over a driving pulley 73 carried on the main drive shaft 38, adjacent the blank feed belt pulley 43 and over an idler pulley 74 mounted at the discharge end of the machine on the shaft 45 adjacent the blank feed belt pulley 44. Intermediate the pulleys 73, 74 the upper run of the belt 72 rides over the rollers 46 to keep the belt pressed against the creasing bar 69.

In this blank folding portion of the machine, the dried thermoplastic adhesive H carried on the side seam marginal edge portion F of the blank is heated to a tacky condition by a direct application of a flame which is projected against the adhesive pattern at a constant distance away from the adhesive as the marginal edge portion F of the blank is advanced along its path of travel and simultaneously folded into the desired upright position as an incident to bringing the edge portions F, G together.

The heating of the dried thermoplastic adhesive H on the blank is effected by an elongated gas burner 76 (Figs. 1, 2, 4, 5, 6, 7, 8) which is disposed above the feed line of the blank and adjacent the path of travel of the side seam marginal edge portion F of the blank. The burner 76 is supported on a pair of brackets 77 secured to the frame 23. The burner 76 generally is rectangular in cross-section and hollow. At the bottom of the burner, a bottom wall section 78 is tapered upwardly along its length from the entrance end toward the discharge end of the machine and is also twisted upwardly at progressing angles of inclination from back to front, i. e. in a direction from the creasing bar 69 toward the curved guide rail 65 emerging from the bottom wall section and merging into the side wall section, thus providing a twisted spiral wall face 79 which generally conforms to the path of travel of the marginal edge portion F of the blank. This spiral wall face 79 of the elongated gas burner 76 contains at least one spiral row of orifices 81 which exactly conforms to the path of travel of the adhesive pattern on the moving blank and which row of orifices is disposed and spaced a constant predetermined distance away from the adhesive pattern.

A suitable gas, such as illuminating gas is introduced into the burner 76 through an inlet pipe 83 connected to the burner at one end thereof. This pipe leads to any suitable source of gas under pressure. The gas issues from the orifices 81 and when ignited provides a spiral row of longitudinally spaced short gas flames 84 (Figs. 5, 6 and 7) which impinge directly against the dried thermoplastic adhesive pattern H on the moving blank as its side seam marginal edge portion F is folded upwardly during advancement of the blank along the curved guide rail 65, and thus reduces the dried adhesive to a tacky condition.

With such a gas burner 76 having a spiral face which closely fits the path of travel of the adhesive pattern H on the moving blank A, the gas flames 84 are always a constant predetermined distance away from the moving adhesive pattern and thus are capable of quickly reducing the adhesive to a tacky condition without damaging the blanks by overheating or burning. With such rapid reduction of the adhesive to its tacky condition the machine is capable of operating an exceedingly high speeds of between 1000 to 2000 blanks per minutes. Such rapid heating capacity of the burner also makes it possible to use short burners and thereby reduces the length of the heating station and thus the overall length of the machine.

Figure 9:
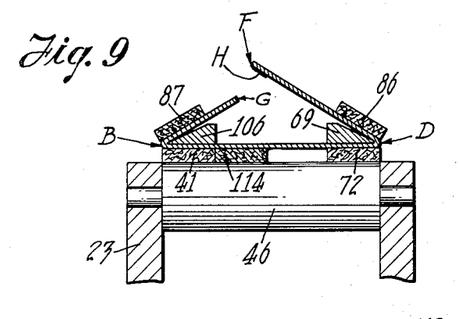
Figures 10, 11:
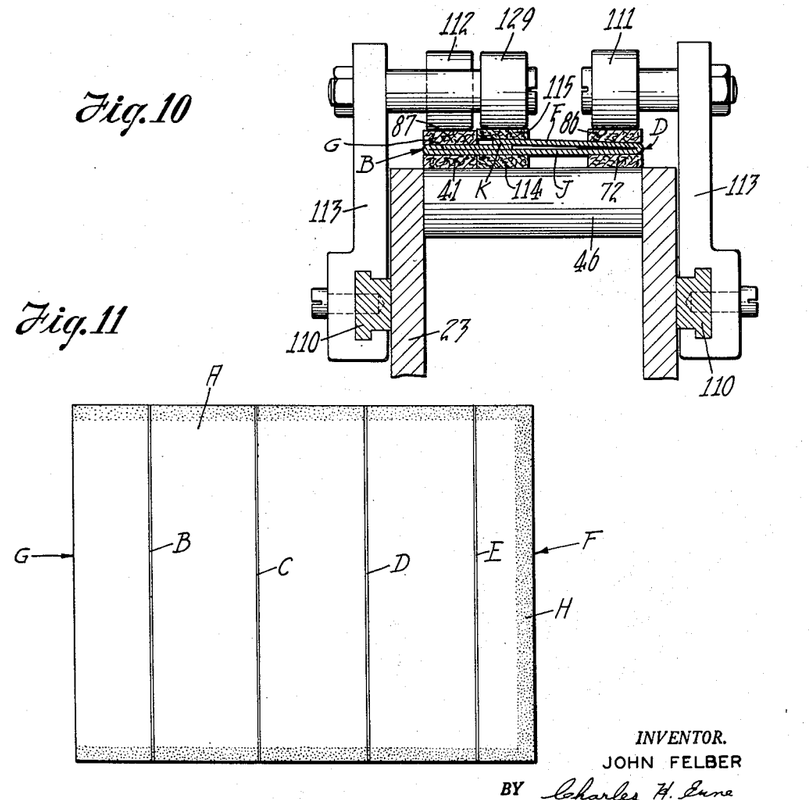
Fig. 11 is an enlarged plan view of a blank which is folded along folding or crease lines in the machine shown in the drawings as an incident to producing a tubular container body.

Following this adhesive tackifying operation the oppositely disposed side seam marginal edge portion G of the blank A is quickly folded upwardly and thence downwardly along the crease line B as shown in Fig. 9 to a position in contact with the portion of the blank between the crease lines B and D as shown in Fig. 10 and simultaneously with this action the edge portion F carrying the tackified adhesive is folded down over the edge portion G as shown in Fig. 10 to overlap the edge portions F, G with the tackified adhesive H between them to produce the side seam K and the collaspsed body J.

The folding over of the marginal edge portion G and the continued folding action of the edge portion F are effected by a pair of twisted endless folding belts 86, 87 the major portions of which are disposed above the blank feed line and adjacent the blank feed belt 41 and the blank supporting belt 72. These folding belts 86, 87 extend from the adhesive heating station toward the discharge end of the machine and operate over pairs of horizontally spaced coaxially mounted main pulleys 88, 89 (Figs. 1, 2 and 3), idler pulleys 91, 92 and angularly disposed belt twister pulleys 93, 94 (see also Fig. 8).

The main pulleys 88, 89 are located at the discharge end of the machine above and in line with the pulleys 44, 74 and are mounted on a cross-shaft 96 journaled in spaced bearings formed in the frame 23 and disposed parallel with the feed belt shaft 45. The idler pulleys 91, 92 are disposed intermediate the ends of the machine at an elevation above the pulley shaft 96 and are carried on adjustable arms 98, 99 mounted on a pair of pivot studs 101 secured in the frame 23 to keep the belts taut. The twister pulleys 93, 94 are disposed adjacent the adhesive heating station, below the blank feed line and along side of the outer edges of the support belt 72 and the belt feed 41 respectively (see Fig. 8). These pulleys 93, 94 are mounted on inclined pivot pins 103 which slope downwardly toward the outer edges of the support belt 72 and the feed belt 41 and are carried in brackets 104 attached to the frame 23.

With this arrangement of pulleys, the upper runs of the blank folding belts 86, 87 extend from the idler pulleys 91, 92 with an imparted twist and thereafter progress under the belt twister pulleys 93, 94 so that the lower runs of the belts, in extending from the twister pulleys 93, 94 to the main pulleys 88, 89 come off the twister pulleys 93, 94 with a slight twist and gradually level off and overlap the blank support belt 72 and blank feed belt 41, in intimate frictional engagement with the latter belts to thus drive the folding belts 86, 87 with the folded blank interposed therebetween, as shown in Figs. 2, 9 and 10.

Hence as the folding belt 87 leaves the twister pulley 94 it engages under the side seam marginal edge portion G of the advancing blank A and lifts this edge portion upwardly (see Fig. 8). A backing bar 106 (Figs. 1, 8 and 9) similar to the backing bar 69 is disposed adjacent the path of travel of the crease line B of the blank to back up the blank during the lifting of the edge portion G and thereby insures folding of the blank along the crease line B. The backing bar 106 is secured to a bracket 107 suspended from the crossbar 62 (Fig. 8).

The twisted portion of the folding belt 87 gradually but quickly raises the edge portion G into a vertical position. As the edge portion G rises into this position it gradually rides from under the twisted portion of the belt and temporarily rides against the inner edge of the belt, and finally gradually rides under the belt as the belt advances into overlying alignment with the feed belt 41 as shown in Fig. 9. This action of the folding belt folds the edge portion G downwardly and inwardly from its vertical position to a position flat against the blank as shown in Fig. 10. To permit this folding action the backing bar 106 at its outer edge is tapered as shown in Fig. 9. This taper gradually flattens out into a horizontal knife edge at the terminal end of the bar.

In a similar manner the oppositely disposed side seam marginal edge portion F is folded over into contact with the flattened edge portion G, with the tackified adhesive between them, by action of the folding belt 86. However the edge portion F is already in a vertical position as shown in Fig. 7 when the folding belt 86 engages it and hence the inner edge of the belt initially engages the edge portion F. As the belt gradually advances into overlying alignment with the support belt 72, it gradually but quickly folds the edge portion F downwardly over the backing bar 69 and against the blank in overlapping relation to the edge portion G as shown in Fig. 10. As in the instance of the backing bar 106, the inner edge of the backing bar 69 is tapered so as to gradually flatten out to a horizontal knife edge at the terminal end of the bar, to permit this folding action.

As the marginal edge portions G, F are folded into overlapping positions as shown in Fig. 10, pressure is applied to them adjacent their crease lines B, D to fully set the folds. For this purpose, the folding belts 86, 87 ride under a plurality of pressure rolls 111, 112 (Figs. 1, 2, 3 and 10) which squeeze the folded blank between the cooperating belts 86, 72 and 87, 41 and the lower supporting rollers 46 under the belts 72, 41. The rollers 111, 112 are carried on upright brackets 113 secured to a pair of T-shaped rails 110 attached to the frame 23 and along which the brackets 113 may be shifted to properly position the rollers.

During this latter travel of the folded blank which now constitutes the collapsed body J, the overlapped and adhesively secured edge portions F, G which now constitute the side seam K (Fig. 10), are compressed to insure strong bonding of the edges together by the adhesive. For this purpose, a pair of cooperating belts comprising a lower seam pressure belt 114 (Figs. 3, 9 and 10) disposed below the blank feed line and an upper seam pressure belt 115 (see also Figs. 1 and 2), disposed above the blank feed line, are provided at the discharge end of the machine in line with the path of travel of the side seam K of the blank.

The lower seam pressure belt 114 is disposed with its upper run parallel and contiguous with the path of travel of the folded or collapsed body J. This belt 114 operates over and is driven by the idler pulley 44 of the feed belt 41 and over a small idler pulley 116 (Fig. 3) mounted in the frame 23 adjacent the adhesive heating station. It also operates over some of the support rollers 46 as shown in Fig. 3.

The upper seam pressure belt 115 is disposed with its lower run parallel and contiguous with the path of travel of the folded or collapsed body J. This belt 115 operates over and is driven by the pulley 89 on the shaft 96 and over a small idler pulley 118 and a large idler pulley 119. The small idler puley 118 is mounted on the upper end of the bracket 121 which extends up from the frame 23 at the discharge end of the machine. The large idler pulley 119 is mounted on a cross-shaft 122 the ends of which are journaled in the upper ends of a pair of spaced and parallel vertical rods 123 (Figs. 1 and 2) carried in brackets 124 attached to the frame 23 on opposite sides of the path of travel of the body J through the machine. The rods 123 also carry adjustable arms 126 having upright guide pins 127 which bear against and guide the twisted folding belts 86, 87.

The lower run of the pressure belt 115, between the idler pulley 119 and the main pulley 89, operates under a plurality of pressure rollers 129 (Figs. 1, 2, 3 and 10) which are disposed between some of the pressure rollers 112 and which are carried by brackets similar to the brackets 113. These pressure rollers 129 press the pressure belt 115 down against the adhesively secured side seam K while the body J travels with and is backed up by the lower pressure belt 114 and rollers 46 to insure proper bonding together of the side seam parts.

At the discharge end of the machine, the folded or collapsed bodies J with their strongly bonded side seams K completed, ride out from between the feed and pressure belts and fall into a discharge chute 132 which carries them to any suitable place of deposit for further treatment.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for folding oppositely disposed marginal edge portions of rectangular fibre container body blanks carrying a pattern of dried thermoplastic adhesive along one of said edge portions to bond said edge portions together in an adhesively secured side seam, the combination of means for continuously advancing a blank along a predetermined path of travel with the side seam marginal edge portions of said blank disposed on opposite sides of said path of travel, folding means disposed adjacent the path of travel of said blank and engageable under the thermoplastic adhesive coated edge portion of said blank and effective in cooperation with said blank advancing means to simultaneously and progressively raise said edge portion from the plane of said blank to a relatively angular position as an incident to overlapping said marginal edge portions to produce a lapped side seam, and an elongated heating device extending along said path of travel of the blank and disposed adjacent said folding means, said heating device being of substantially spiral configuration to dispose and constantly conform a wall thereof to the adjacent spiral path of travel of the adhesive pattern on the continuously advancing and simultaneously rising edge portion of said blank, whereby to progressively heat and reduce said dried thermoplastic adhesive to a tacky condition during the continuous advancement and simultaneous angular displacement of said edge portion for adhesively bonding said side seam.

2. In a machine for folding oppositely disposed marginal edge portions of rectangular fibre container body blanks carrying a pattern of dried thermoplastic adhesive along one of said edge portions to bond said edge portions together in an adhesively secured side seam, the combination of means for continuously advancing a blank along a predetermined path of travel with the side seam marginal edge portions of said blank disposed on opposite sides of said path of travel, folding means disposed adjacent the continuous path of travel of said blank and engageable under the thermoplastic adhesive coated edge portion of said blank and effective in cooperation with said blank advancing means to simultaneously and progressively raise said edge portion in a spiral path from the plane of said blank to a relatively angular position as an incident to overlapping said marginal edge portions to produce a lapped side seam, and an elongated heating device extending along said path of travel of the blank and having a spiral face disposed adjacent said folding means, said heating device comprising a heating element of substantially spiral configuration having a wall thereof disposed adjacent and conforming to the spiral path of said continuously rising and advancing blank edge portion to maintain a constant predetermined distance between said heating element wall and the adhesive pattern on said blank edge portion, whereby to progressively heat and reduce said dried thermoplastic adhesive to a tacky condition during the continuous advancement and simultaneous angular displacement of said edge portion for adhesively bonding said side seam.

3. In a machine for folding oppositely disposed marginal edge portions of rectangular fibre container body blanks carrying a pattern of dried thermoplastic adhesive along one of said edge portions to bond said edge portions together in an adhesively secured side seam, the combination of means for continuously advancing a blank along a predetermined path of travel with the side seam marginal edge portions of said blank disposed on opposite sides of said path of travel, a stationary spirally curved folding rail disposed adjacent the continuous path of travel of said blank and engageable under the thermoplastic adhesive coated edge portion of said blank and effective in cooperation with said blank advancing means to simultaneously and progressively raise said edge portion in a spiral path from the plane of said blank to a relatively angular position as an incident to overlapping said marginal edge portions to produce a lapped side seam, and an elongated heating device positioned to extend along said path of travel of the blank and having an elongated wall face of spiral configuration disposed adjacent said folding rail, said heating device wall constituting a radiant heating means disposed adjacent and conforming to the spiral path of said continuously rising and advancing blank edge portion to maintain a constant predetermined distance between said heating element and the adhesive pattern on said blank edge portion, whereby to heat and reduce said dried thermoplastic adhesive to a tacky condition during the continuous advancement and simultaneous angular displacement of said blank edge portion for adhesively bonding said side seam.

4. A machine of the character defined in claim 2 wherein said spirally shaped heating device comprises an elongated hollow gas burner having on a wall thereof at least one spiral row of spaced gas orifices for projecting open gas flames of a predetermined length directly against the adhesive pattern on said continuously advancing and rising blank edge portion to progressively heat said dried thermoplastic adhesive thereon to a tacky condition throughout its longitudinal extent.

5. In a machine for folding oppositely disposed edge portions of rectangular fibre container body blanks carrying a pattern of dried thermoplastic adhesive along one of said edge portions to adhesively secure said edge portions together in a side seam, the combination of means for continuously advancing a blank along a predetermined path of travel with the side seam marginal edge portions of said blank disposed on opposite sides of said path, folding means disposed on opposite sides of said continuous path of travel of said blank and engageable under and against the oppositely disposed marginal edge portions of said blank, said folding means cooperating with said advancing means for progressively folding said blank edge portions upwardly and thence inwardly into overlapping relation with the adhesive pattern disposed therebetween to produce a side seam for a container body, and an elongated heating device disposed adjacent the path of travel of the thermoplastic adhesive coated blank edge portion and extended along the portion of said path of travel in which said edge portion is folded upwardly, said elongated heating device comprising a continuous heating wall of substantially spiral configuration conforming to and spaced a constant predetermined distance from the spiral path of travel of said adhesive pattern on said blank edge for progressively heating and reducing said dried thermoplastic adhesive to a tacky condition along its longitudinal extent during the continuous advancement and upward folding travel of said blank edge portion for adhesively bonding together the overlapped marginal edge portions of said blank to produce said side seam.

6. In a machine for folding oppositely disposed edge portions of rectangular fibre container body blanks carrying a pattern of dried thermoplastic adhesive along one of said edge portions to adhesively secure said edge portions together in a side seam, the combination of means for continuously advancing a blank along a predetermined path of travel with the side seam marginal edge portions of said blank disposed on opposite sides of said path, folding means disposed on opposite sides of said continuous path of travel of said blank and engageable under and against the oppositely disposed blank edge portions, said folding means cooperating with said advancing means for progressively folding said blank edge portions upwardly and thence inwardly into overlapping relation with the adhesive pattern disposed therebetween to produce a side seam for a container body, an elongated heating device disposed adjacent the path of travel of the thermoplastic adhesive coated blank edge portion and supported to extend along the portion of said path of travel in which said edge portion is folded upwardly, said heating device including an elongated heating element of substantially spiral configuration having a wall thereof conforming to and spaced a constant predetermined distance from the corresponding spiral path of travel of said adhesive pattern on a said blank edge for progressively heating said dried thermoplastic adhesive to a tacky condition throughout its longitudinal extent during the continuous advancement and upward folding travel of said blank edge portion, and pressure means for tightly compressing said overlapped blank edge portions to bond them together with the tacky adhesive interposed therebetween.

7. A heating device for tackifying dried thermoplastic adhesive on a marginal edge portion of a continuously moving fibre container body blank while being folded into tubular form, comprising an elongated member of substantial spiral configuration having a spiral shaped wall section substantially conforming to the spiral path of travel of a blank marginal edge portion undergoing a progressive folding operation while being continuously advanced, and heating means of spiral configuration carried by said spiral wall section and extending longitudinally thereof in constant and spaced relation to and conforming to the spiral path of travel of the adhesive pattern on said blank edge portion for uniformly heating said dried thermoplastic adhesive to a tacky condition simultaneously with and during the aforesaid folding operation on said continuously moving body blank.

8. A heating device for tackifying dried thermoplastic adhesive arranged in a predetermined pattern on a marginal edge portion of a continuously moving fibre container body blank being folded into tubular form, comprising a hollow elongated gas burner of generally rectangular cross section, said burner having an elongated twisted wall section of substantially spiral configuration emerging from a bottom wall section thereof and merging into an adjacent side wall section, said twisted wall section extending throughout the length of said burner for location adjacent and in substantial conformity to the spiral path of travel of a marginal edge portion of a continuously moving body blank undergoing said folding operation, and at least one row of spaced gas orifices disposed in said twisted gas burner wall section, said row of orifices extending longitudinally of said twisted wall section in a spiral arrangement spaced a constant predetermined distance from and conforming to the continuous spiral path of travel of the adhesive pattern on said blank edge portion for projecting open jets of gas flame directly against said adhesive pattern for uniformly and progressively heating said dried thermoplastic adhesive to a tacky condition during and as an incident to the blank operation.

9. The method of forming a tubular container body from a flat fibre blank having a thermoplastic adhesive coating on a marginal edge portion thereof, comprising continuously advancing the blank along a predetermined path of travel, progressively folding opposite laterally disposed portions of said flat blank into angular position during its continuous advancement, continuously and progressively heating the thermoplastic adhesive along said blank edge portion during the progressive folding thereof from the flat into said angularly disposed position to tackify said adhesive, and thereafter folding said blank marginal edge portions inwardly during its continued advancement and compressing the same in tight overlapped relation with the tackified adhesive interposed therebetween to constitute a progressively formed adhesively secured side seam in said tubular fibre container body.

10. The method of forming tubular container bodies from flat scored fibre blanks each having a thermoplastic adhesive coating on a marginal edge portion thereof, comprising continuously feeding and advancing the blanks in processional order along a horizontal path of travel, progressively folding opposite laterally disposed portions of said flat blanks from their leading to their trailing edges and along spaced parallel score lines thereof into upstanding position during the continuous advancement of said blanks, continuously and progressively projecting an open gas flame against the thermoplastic adhesive along said blank edge portions during the folding thereof from the flat into said upright position to tackify said adhesive, thereafter folding said blank marginal edge portions inwardly into overlapped relation with the tackified adhesive interposed therebetween to constitute a progressively formed side seam during the continued advancement of the blanks, and compressing said overlapped blank edges during such continued advancement to adhesively secure said side seam in each of a plurality of flattened tubular container bodies.

References Cited in the file of this patent
UNITED STATES PATENTS

| | | |
|---|---|---|
| 1,104,013 | Staude | July 21, 1914 |
| 2,169,311 | Widell | Aug. 15, 1939 |
| 2,192,950 | Widell | Mar. 12, 1940 |
| 2,390,120 | Peters | Dec. 4, 1945 |